US007869097B2

(12) United States Patent
Miyata (10) Patent No.: US 7,869,097 B2
(45) Date of Patent: Jan. 11, 2011

(54) PRINT CONTROLLING PROGRAM AND PRINT SYSTEM FOR TRANSPARENT-PRINTING SECOND PRINT DATA IN SUPERPOSITION ON FIRST PRINT DATA (75) Inventor: Yuji Miyata, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1172 days.

(21) Appl. No.: 11/475,176

(22) Filed: Jun. 27, 2006

(65) Prior Publication Data
US 2007/0013955 A1 Jan. 18, 2007

(30) Foreign Application Priority Data
Jun. 27, 2005 (JP) ............................. 2005-186819

(51) Int. Cl.
H04N 1/40 (2006.01)
G06K 9/36 (2006.01)
(52) U.S. Cl. ...................... 358/3.28; 358/450; 358/540; 382/100; 382/232; 382/284; 380/51
(58) Field of Classification Search ................ 358/3.28, 358/540, 450; 382/100, 232, 284; 380/51, 380/54, 201, 210, 252, 287; 370/522–529; 283/72, 74–81, 93, 113, 901, 902, 114; 713/176, 713/179; 348/461, 463
See application file for complete search history.

(56) References Cited

U.S. PATENT DOCUMENTS 6,504,955 B2   1/2003  Oomura et al.
6,731,409 B2*  5/2004  Wang .......................... 358/3.28
6,847,467 B2*  1/2005  Obrador ...................... 358/1.16
7,006,257 B1*  2/2006  Yamazaki et al. ........... 358/3.28
7,139,444 B2* 11/2006  Ameline et al. ............. 382/305
7,369,679 B2*  5/2008  Ameline et al. ............. 382/100
7,411,702 B2*  8/2008  Eguchi et al. ............... 358/3.28
2007/0035775 A1* 2/2007  Asai ........................... 358/3.28
2007/0035776 A1* 2/2007  Asai ........................... 358/3.28
2009/0021793 A1* 1/2009  Lu et al. ..................... 358/3.28

FOREIGN PATENT DOCUMENTS

JP  10-124276     5/1998
JP  11-149355     6/1999
JP  11-298717    10/1999
JP  2003-051929   2/2003

OTHER PUBLICATIONS

Japanese Office Action issued in Japanese Patent Application No. JP 2005-186819, dated Dec. 2, 2008.

* cited by examiner

Primary Examiner—Twyler L Haskins
Assistant Examiner—Dennis Dicker
(74) Attorney, Agent, or Firm—Baker Botts L.L.P.

(57) ABSTRACT

A computer program product for enabling a computer to have a printing control function for transparent-printing second print data in superposition on first print data includes software instructions for enabling the computer to separate the second print data into parts for combining with the first print data and parts not for the combining with the first print data, and combining the data of the parts set for the combining with the first print data so as to be superposed on the first print data.

10 Claims, 10 Drawing Sheets

PROCESS FOR RENDERING TRANSMISSIVE
WATERMARK OF MONOCHROMATIC OBJECT

PROCESS FOR RENDERING TRANSMISSIVE WATERMARK OF MULTICOLORED OBJECT

DIVIDED AREA

FIG. 11C

COMPOSITING AREA

TRANSMISSIVE WATERMARK PROCESS

FIG. 16A

BACKUP AREA

FIG. 16B

RENDERING AREA

PRINT CONTROLLING PROGRAM AND PRINT SYSTEM FOR TRANSPARENT-PRINTING SECOND PRINT DATA IN SUPERPOSITION ON FIRST PRINT DATA

CROSS-REFERENCE TO THE RELATED APPLICATION(S)

This application is based upon and claims a priority from prior Japanese Patent Application No. 2005-186819 filed on Jun. 27, 2005, the entire contents of which are incorporated herein by reference.

TECHNICAL FIELD

Aspects of the present invention relate to a print controlling program and a print system for performing the transparent print process of a so-called "watermark" or the like. More particularly, the invention is effective when applied to the control of a printer, which is connected to a computer that is controlled by an operating system (OS) having a GDI (Graphic Device Interface), such as "Windows" (registered trademark).

BACKGROUND

In a computer, which is controlled by "Windows" or the like OS having a GDI, a print controlling program such as printer driver is installed. The print controlling program controls a printer connected to the computer (for example, JP-A-11-149355).

SUMMARY

A "watermark" is also called an "embedded image", and the string of characters constituting the watermark desirably should be able to be read at the mere glance of a sheet. Therefore, the watermark is often depicted by a large character string at the center of the sheet.

However, when the watermark is simply smeared on an original document, the essential document is hidden by the string of characters constituting the watermark, and the main text can not be read. In case of printing the watermark on the sheet, therefore, transparent print usually needs to be performed.

One of the known techniques for the transparent print is a technique in which the watermark is rendered on the document every second pixel or every several pixels (hereinbelow, this technique shall be termed the "checkered rendering").

Besides, the checkered rendering process has heretofore been executed in such a way that the data of the watermark and checkered pattern data expressive of the positions of the pixels to be rendered are transmitted to a printer in a PDL (Page Description Language) format and that the watermark and the pattern data are combined within the printer.

With the checkered rendering technique employing the PDL, therefore, the printer needs to carry a device for interpreting the PDL. Here, since the printer of the PDL format carries the device for interpreting the PDL, it is comparatively expensive in ordinary cases.

Meanwhile, a printer called "GDI printer" has become the main stream in printers of low prices. This printer has a scheme in which image processing (rendering processing) is executed on a computer side, while a printer side receives data subjected to the image processing and simply prints the data.

Accordingly, the GDI printer that does not execute the image processing on the printer side cannot perform the transparent print with the prior-art technique, which transmits the data of the watermark and the checkered pattern data to the printer and executes the combining process (image processing) of the watermark and the pattern data within the printer.

Aspects of the present invention provide a print controlling program and a print system that can permit transparent print even in a printer such as GDI printer, which is not furnished with a device for interpreting a description language.

According to an aspect of the invention, there is provided a computer program product for enabling a computer to have a printing control function for transparent-printing second print data in superposition on first print data, comprising: software instructions for enabling the computer to perform predetermined operations; and a computer readable medium bearing the software instructions, wherein: the predetermined operations comprises: separating the second print data into parts for combining with the first print data and parts not for the combining with the first print data; and combining the data of the parts set for the combining with the first print data so as to be superposed on the first print data.

Thus, according to the aspect, among data separated by the mask process unit into the parts for the combining with the first print data and the parts not for the combining with the first print data, the data of the parts set for the combining with the first print data are combined so as to be superposed on the first print data.

Accordingly, the second print data is partly rendered onto the first print data, so that the transparent print can be performed even in a printer such as GDI printer, which is not furnished with a device for interpreting the PDL.

According to another aspect of the invention, there is provided a computer program product for enabling a computer to have a printing control function for transparent-printing second print data in superposition on first print data, comprising: software instructions for enabling the computer to perform predetermined operations; and a computer readable medium bearing the software instructions, wherein: the predetermined operations comprises: storing the second print data; separating the stored second print data into parts for combining with the first print data and parts not for the combining with the first print data; and combining the data of the parts set for the combining with the first print data so as to be superposed on the first print data.

Thus, according to the aspect, among data separated by the mask process unit into the parts for the combining with the first print data and the parts not for the combining with the first print data, the data of the parts set for the combining with the first print data are combined so as to be superposed on the first print data.

Accordingly, the second print data is partly rendered onto the first print data, so that the transparent print can be performed even in a printer such as GDI printer, which is not furnished with a device for interpreting the PDL.

According to another aspect of the invention, there is provided a computer program product for enabling a computer to have a printing control function for transparent-printing second print data in superposition on first print data, comprising; software instructions for enabling the computer to perform predetermined operations; and a computer readable medium bearing the software instructions, wherein: the predetermined operations comprises: dividing the second print data at a predetermined number of divisions; separating the divided data into parts for combining with the first print data and parts not for the combining with the first print data; combining the data of the parts set for the combining with the first print data so as to be superposed on the first print data; and operating the separating and the combining repeatedly the same number of times as the number of divisions.

Thus, according to the aspect, among data separated by the mask process unit into the parts for the combining with the first print data and the parts not for the combining with the first print data, the data of the parts set for the combining with the first print data are combined so as to be superposed on the first print data.

Besides, the second print data is divided, and the divided data are combined with the first print data at a plurality of separate times, so that the second print data can be transparent-printed (or watermarked) even in a case where the storage capacity of the storage unit is small.

In the aspect, accordingly, the transparent print can be performed even in a case where a printer that is not furnished with a device for interpreting the PDL is connected to the computer whose storage unit has the small storage capacity.

According to another aspect of the invention, there is provided a computer program product for enabling a computer to have a printing control function for transparent-printing second print data in superposition on first print data, comprising: software instructions for enabling the computer to perform predetermined operations; and a computer readable medium bearing the software instructions, wherein: the predetermined operations comprises: storing the first print data; combining the second print data so as to be superposed on the first print data; separating the stored data into parts for combining with the combined data and parts not for the combining with the combined data; and combining the data of the parts set for the combining with the combined data so as to be superposed on the combined data.

Thus, according the aspect, among the data separated by the mask process unit into the parts for the combining with the first print data and the parts not for the combining with the first print data, the data of the parts set for the combining with the first print data are combined onto the data (hereinbelow, termed the "simple combining data") in which the second print data is combined so as to be superposed on the first print data. Therefore, the first print data separated as the parts for the combining is combined so as to be superposed on the parts corresponding to the second print data, among the simple combining data.

Accordingly, the situation becomes equivalent to a state where the second print data is partly rendered on the first print data, so that the transparent print can be performed even in a printer such as GDI printer, which is not furnished with a device for interpreting the PDL.

According to another aspect of the invention, there is provided a computer program product for enabling a computer to have a printing control function for transparent-printing second print data in superposition on first print data, comprising: software instructions for enabling the computer to perform predetermined operations; and a computer readable medium bearing the software instructions, wherein; the predetermined operations comprises: detecting whether or not the second print data is composed of a plurality of colors; dividing the second print data at a predetermined number of divisions, in a case where the second print data has been decided as being composed of the plurality of colors; separating the second print data into parts for combining with the first print data and parts not for the combining with the first print data; separating the divided data into parts for the combining with the first print data and parts not for the combining with the first print data; combining the parts of the second print data set for the combining with the first print data so as to be superposed on the first print data; combining the parts of the divided data set for the combining with the first print data so as to be superposed on the first print data; operating the separating of the divided data and the combining of the parts of the divided data repeatedly the same number of times as the number of divisions, in the case where the print data has been decided as being composed of the plurality of colors; and operating the separating of the second print data and the combining of the parts of the second print data, in the case where the print data has been decided as not being composed of the plurality of colors.

Thus, according to the aspect, when the second print data is composed of the plurality of colors, the transparent print is performed by using the divided data. When the second print data is not composed of the plurality of colors, that is, when the second print data is composed of a single color such as black and white, the transparent print is performed without dividing the second print data. Accordingly, the transparent print can be performed by the optimal technique corresponding to the storage capacity of the storage unit, so that the transparent print can be efficiently performed.

According to another aspect of the invention, there is provided a print system for transparent-printing second print data in superposition on first print data, comprising: a printer that prints the print data; a storage unit that is controlled by an arithmetic unit; a mask process unit that separates the second print data into parts for combining with the first print data and parts not for the combining with the first print data; and a print data combining unit that composites the data of the parts set for the combining with the first print data so as to be superposed on the first print data.

Thus, according to the aspect, the second print data is partly rendered on the first print data so that the transparent print can be performed even in a printer such as GDI printer, which is not furnished with a device for interpreting the PDL.

According to another aspect of the invention, there is provided a print system for transparent-printing second print data in superposition on first print data, comprising: a printer that prints the print data; a storage unit that is controlled by an arithmetic unit; an object storage unit that stores the second print data in the storage unit; a mask process unit that separates the data stored in the storage unit by the object storage unit into parts for combining with the first print data and parts not for the combining with the first print data; and a print data combining unit that composites the data of the parts set for the combining with the first print data so as to be superposed on the first print data.

Thus, according to the aspect, the second print data is partly rendered on the first print data so that the transparent print can be performed even in a printer such as GDI printer, which is not furnished with a device for interpreting the PDL.

According to another aspect of the invention, there is provided a print system for transparent-printing second print data in superposition on first print data, comprising: a printer that prints the print data; a storage unit that is controlled by an arithmetic unit; a print data division unit that divides the second print data at a predetermined number of divisions; a mask process unit that separates the divided data into parts for combining with the first print data and parts not for the combining with the first print data; a print data combining unit that composites tha data of the parts set for the combining with the first print data so as to be superposed on the first print data; and a repetition process unit that operates the mask process unit and the print data combining unit repeatedly the same number of times as the number of divisions.

Thus, according to the aspect, the transparent print can be performed even in a case where a printer that is not furnished with a device for interpreting the PDL is connected to the computer whose storage unit has a small storage capacity.

According to another aspect of the invention, there is provided a print system for transparent-printing second print data in superposition on first print data, comprising: a printer that prints the print data; a storage unit that is controlled by an arithmetic unit; a print data backup unit that stores the first print data in the storage unit; an object data combining unit that composites the second print data so as to be superposed on the first print data; a mask process unit that separates the data stored in the storage unit into parts for combining with the data combined by the object data combining unit and parts not for the combining with the data combined by the object data combining unit; and a print data combining unit that composites the data of the parts set for the combining with the data combined by the object data combining unit among the data stored in the storage unit so as to be superposed on the data combined by the object data combining unit.

Thus, according to the aspect, the situation becomes equivalent to a state where the second print data is partly rendered on the first print data, so that the transparent print can be performed even in a printer such as GDI printer, which is not furnished with a device for interpreting the PDL.

A print system for transparent-printing second print data in superposition on first print data, comprising: a printer that prints the print data; a storage unit that is controlled by an arithmetic unit; a composing color detection unit that detects whether or not the second print data is composed of a plurality of colors; a print data division unit that divides the second print data at a predetermined number of divisions, in a case where the second print data has been decided as being composed of the plurality of colors; a first mask process unit that separates the second print data into parts for combining with the first print data and parts not for the combining with the first print data; a second mask process unit that separates the data divided by the print data division unit into parts for the combining with the first print data and parts not for the combining with the first print data; a first print data combining unit that composites the data of the parts set for the combining with the first print data so as to be superposed on the first print data; a second print data combining unit that composites the data of the parts set for the combining with the first print data so as to be superposed on the first print data; a repetition process unit that operates the second mask process unit and the second print data combining unit repeatedly the same number of times as the number of divisions, in the case where the print data has been decided as being composed of the plurality of colors; and a process unit that operates the first mask process unit and the first print data combining unit, in the case where the print data has been decided as not being composed of the plurality of colors.

Thus, according to the aspect, when the second print data is composed of the plurality of colors, the transparent print is performed by using the divided data. When the second print data is not composed of the plurality of colors, that is, when the second print data is composed of a single color such as black and white, the transparent print is performed without dividing the second print data. Accordingly, the transparent print can be performed by the optimal technique corresponding to the storage capacity of the storage unit, so that the transparent print can be efficiently performed.

BRIEF DESCRIPTION OF THE DRAWINGS

These and other objects and advantages of the present invention will be more fully apparent from the following detailed description taken in conjunction with the accompanying drawings, in which.

DETAILED DESCRIPTION OF THE ILLUSTRATIVE ASPECTS

Now, aspects of the present invention will be described in conjunction with the drawings.

In each of the aspects, a print controlling program is installed in a computer to which a printer is connected, whereby the computer and the printer are caused to function as a print system.

First Aspect

Figure 1:
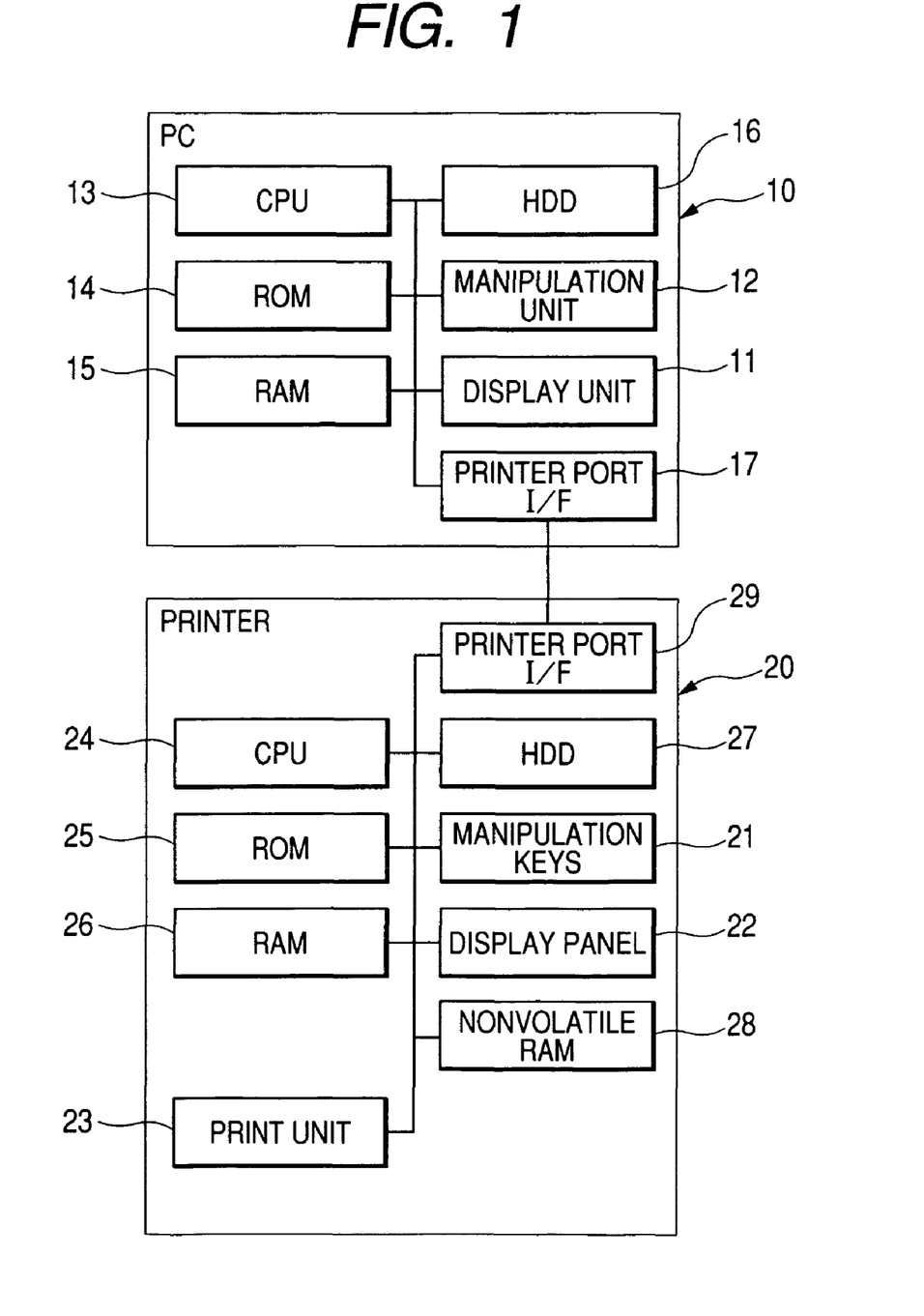
FIG. 1 is a schematic diagram of a print system according to an aspect of the present invention.

FIG. 1 is a diagram showing the outline of a print system according to this aspect, and the print system is configured of a computer 10, a printer 20, etc. Now, the outline of the configuration of the print system according to this aspect will be described with reference to FIG. 1.

The configuration of the computer 10 is the same as that of a well-known computer. Specifically, the computer 10 comprises a display unit 11, which is constructed of an LCD (Liquid Crystal Display), a CRT (Cathode Ray Tube) or the like for displaying an image and characters; a manipulation unit 12, which is constructed of a mouse (not shown) and a keyboard (not shown) or the likes that form a pointing unit for moving a pointer (not shown) pointing to any specified position of the display unit 11; a CPU (Central Processing Unit) 13; a ROM (Read Only Memory) 14; a RAM (Random Access Memory) 15, which is controlled by the CPU 13; an HDD (Hard Disk Drive) 16; and a printer port I/F (Interface) 17 to which the printer 20 is connected. Incidentally, the computer 10 shall be written as the "PC 10" below.

Besides, the printer 20 according to the aspect is a GDI printer, which comprises manipulation keys 21 for the selection, etc. of functions comprised in the printer 20; a display panel 22 that displays a manipulation content, a working situation or the like; a print unit 23 that prints characters, an image or the like on a record medium such as paper; a CPU 24; a ROM 25; a RAM 26; an HDD 27; a nonvolatile RAM 28 that is capable of retaining a stored content even when the feed of electric power has been stopped; and a printer port interface 29 for the direct connection of the printer 20 to the PC 10 without the intervention of a LAN.

Next, there will be described the operation of a program for transparent-printing character (text) data as a watermark in the PC 10 according to the aspect. By the way, in this aspect, the "Windows" (registered trademark) is employed as the OS (Operating System) of the PC 10, and terms not especially explained (defined) shall be used as general significances in the "Windows" below.

Figure 2:
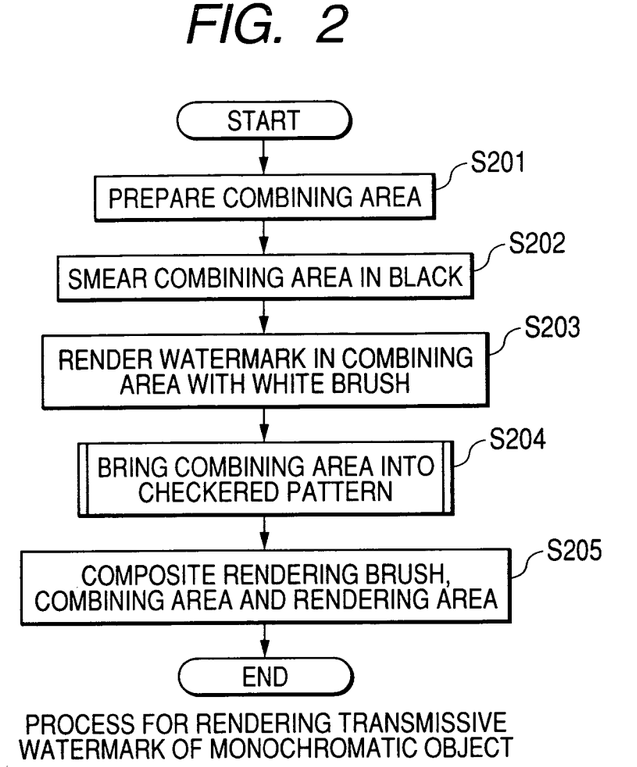
FIG. 2 is a flow chart showing the outline of a print controlling program according to the first aspect of the invention.

FIG. 2 is a flow chart showing the control flow of the transparent-printing program according to this aspect, and FIG. 4-FIG. 7 are conceptual diagrams of contents for which control steps in FIG. 2 are executed. Now, there will be exemplified a case where letter "A" shown in FIG. 3A (hereinbelow, the letter A shall be termed the "second print data") is transparently printed as the watermark on the pattern of a house shown in FIG. 3B (hereinbelow, the pattern shall be termed the "first print data").

When a transparent print process is selected, the transparent-printing program shown in FIG. 2 is started. Then, first of all, a combining storage area of the same size as a storage capacity necessary for rendering on the RAM 15 a final rendered result is reserved in the RAM 15 (S201). The final rendered result is a state (refer to FIG. 7) where the second print data has been transparent-printed (or watermarked) on the first print data.

By the way, in this aspect, the second print data is composed of monochromatic print data, and hence, the size of the combining area is determined with one pixel being one bit. Needless to say, however, this aspect may well employ full-color data as the first print data.

Figure 4:
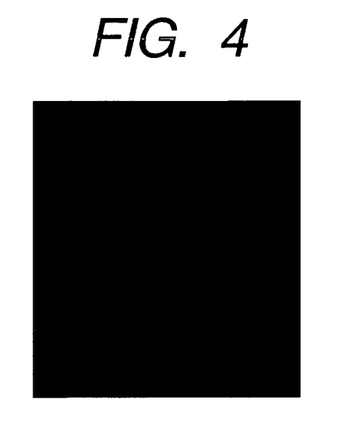
FIG. 4 is a conceptual diagram of a content for which a control step in FIG. 2 is executed.
Figure 5:
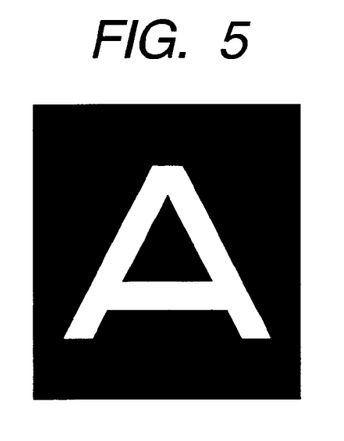
FIG. 5 is a conceptual diagram of a content for which a control step in FIG. 2 is executed.
Figure 6:
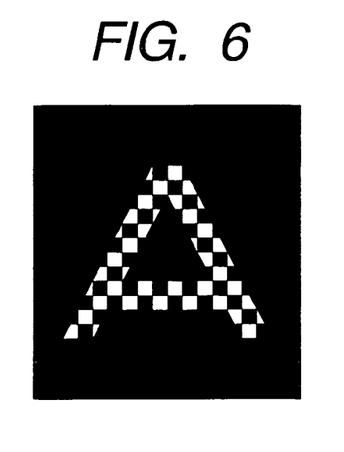
FIG. 6 is a conceptual diagram of a content for which a control step in FIG. 2 is executed.
Figure 7:
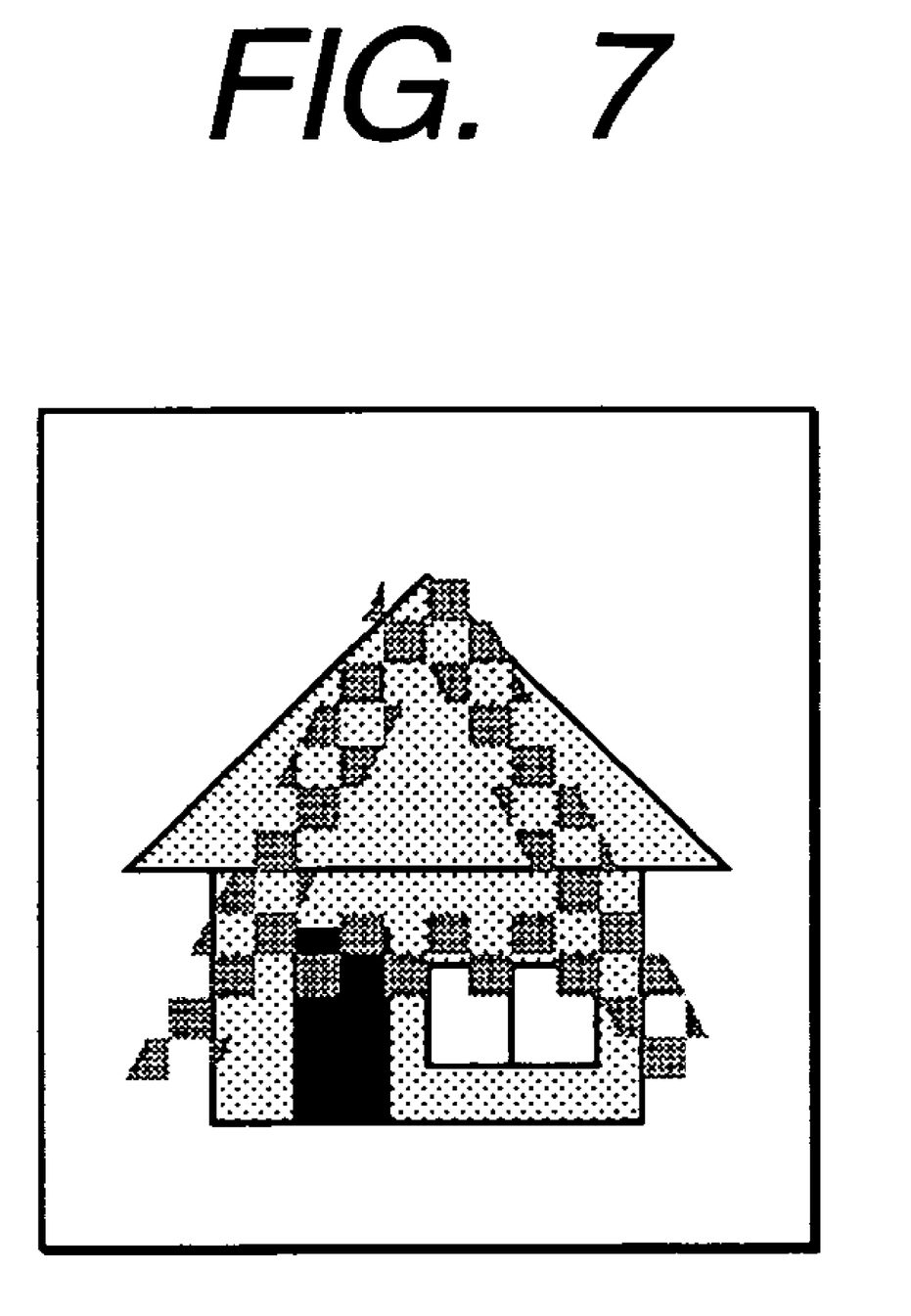
FIG. 7 is a conceptual diagram of a content for which a control step in FIG. 2 is executed.

Subsequently, the whole combining area is smeared in black as shown in FIG. 4 (S202), and the second print data (letter A) is rendered in white in the combining area smeared in black, as shown in FIG. 5 (S203).

The words "black" and "white" termed here do not signify "colors which are printed on a sheet".

The words are colors for identifying an area, which is rendered, and an area, which is not rendered, in that area on the RAM 15 in which the final rendered result is rendered (hereinbelow, this area shall be termed the "rendering area").

That is, in this aspect, a part of "white" in the combining area is rendered in the rendering area, and a part of "black" is not rendered in the rendering area. Accordingly, the combining area may well be smeared in, for example, "red" instead of "black" at the step S202, and the second print data may well be rendered in "blue" in the combining area at the step S203.

Besides, when the processing of the step S203 has been ended, the combining area is partitioned in a checkered pattern so as to be separated into partition areas, which are rendered in the rendering area (areas indicated in white in FIG. 6), and areas, which are not rendered in the rendering area (areas indicated in black in FIG. 6) (S204).

More specifically, in this aspect, in the combining area shown in FIG. 5, a large number of lines partitioning the combining area from the upper end to the lower end thereof in single-pixel units are supposed, and cells partitioning each of the large number of lines from the left end to the right end thereof in single-pixel units are supposed. Only the odd-numbered cells are rendered in black at the odd-numbered lines, whereas only the even-numbered cells are rendered in black at the even-numbered lines, whereby a mask process is performed for the areas partitioned in the checkered pattern.

Subsequently, the image data rendered in the combining area subjected to the mask process at the step S204 is combined so as to be superposed on the first print data rendered in the rendering area (S205). On this occasion, in the image data rendered in the combining area, the partition areas indicated in black are not rendered in the rendering area, whereas the partition areas indicated in white are rendered so as to be superposed on the first print data, in the original color of the second print data (in this aspect, red).

Incidentally, the first print data and second print data, which have been combined in the rendering area are subjected to a color conversion, a binarization process and a desired scale-down process, whereupon they are transmitted to and printed by the printer 20.

In the aspect, in the data, which have been separated by the mask process into the parts for use in the combining with the first print data and the parts not for use in the combining with the first print data, the data of the parts set for use in the combining with the first print data are combined so as to be superposed on the first print data.

Accordingly, the second print data is combined on the first print data as in checkered rendering, so that the transparent print can be performed even in a printer such as GDI printer, which is not equipped with a device for interpreting the PDL.

In the aspect, the CPU 13 corresponds to an arithmetic unit, the RAM 15 corresponds to a storage unit, the step S203 corresponds to an object storage unit, the step S204 corresponds to a mask process unit and the step S205 corresponds to a print data combining unit.

By the way, in the aspect, at the step S203 corresponding to the object storage unit, the display color of the second print data (watermark) has been neglected, and only the shape thereof has been rendered (stored) in white in the combining area reserved on the RAM 15. However, this aspect is not restricted to such an aspect, but it may well render (store) the second print data in the original color of this second print data in the combining area.

Second Aspect

In the first aspect, the second print data has been transparent-printed by subjecting the second print data (watermark) to the mask process and then combining it with the first print data. In contrast, this aspect consists in that the second print data is divided into a plurality of data, that the divided data are subjected to mask processes, and that the divided data subjected to the mask processes are thereafter combined with the first print data.

Figure 8:
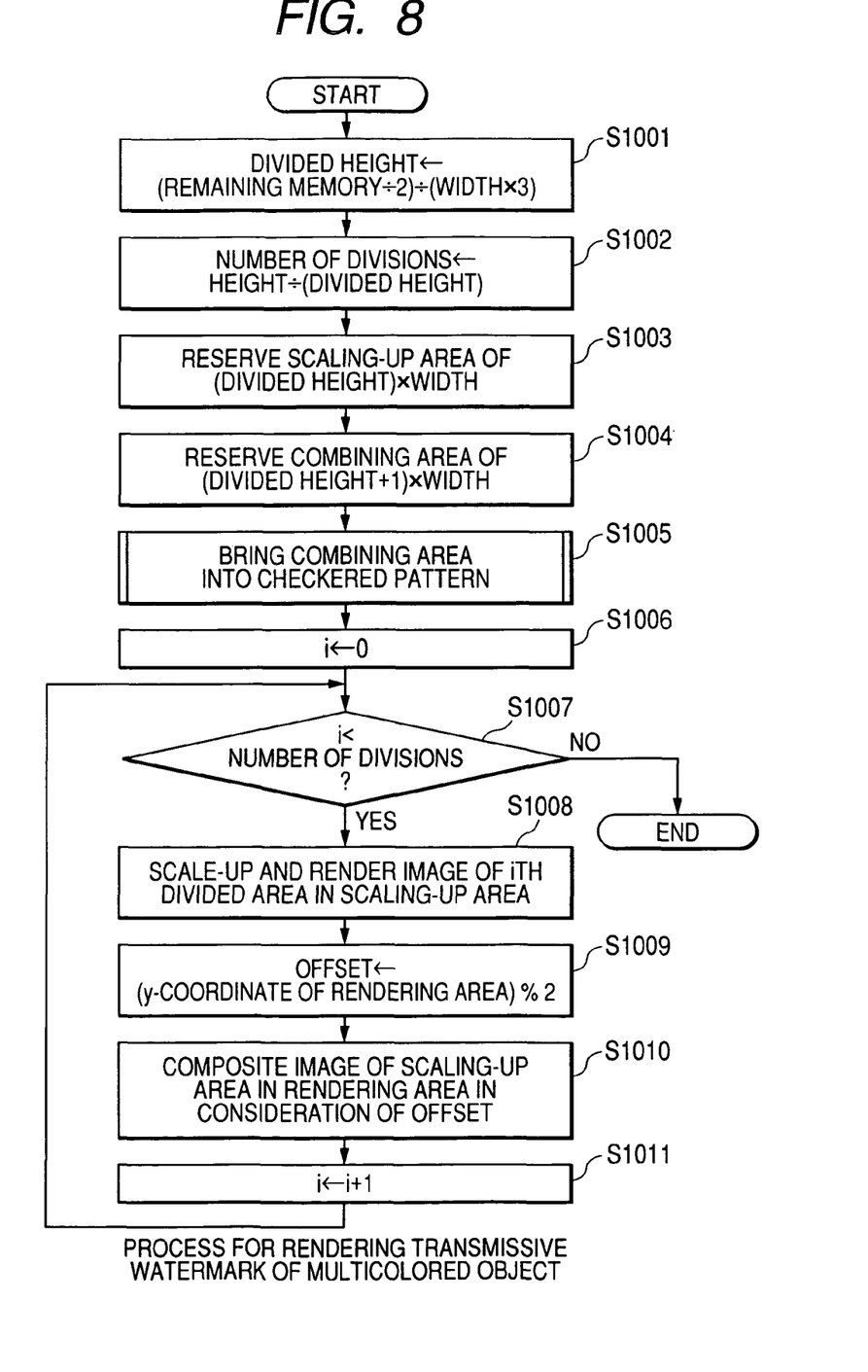
FIG. 8 is a flow chart showing the outline of a print controlling program according to the second aspect of the invention.
Figure 9A:
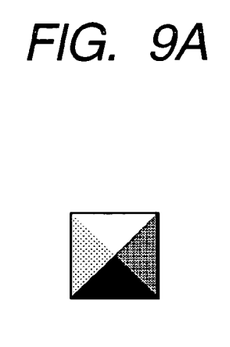
FIGS. 9A to 9C are diagrams showing data to-be-printed.
Figure 9B:
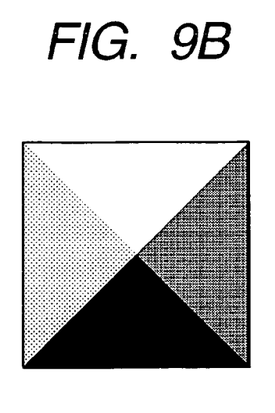
Figure 9C:
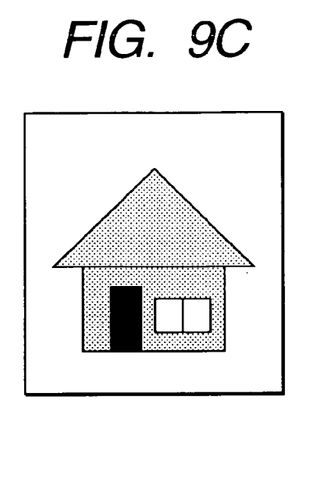
Figure 10:
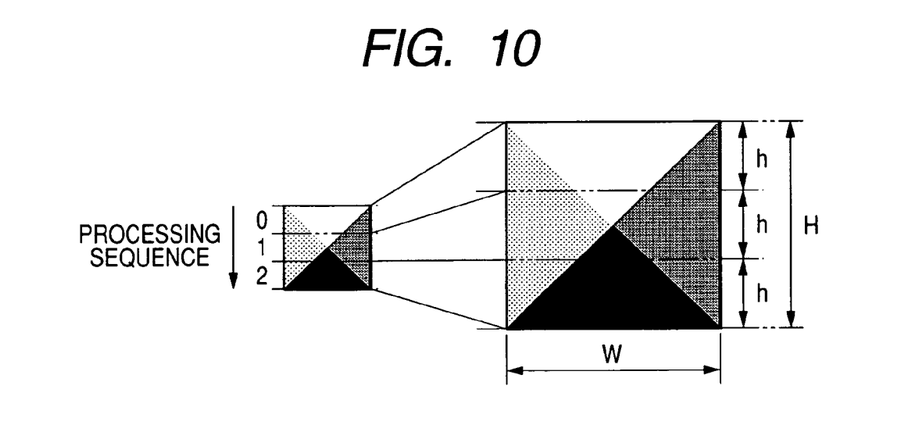
FIG. 10 is a conceptual diagram of a content for which a control step in FIG. 8 is executed.

FIG. 8 is a flow chart showing the control flow of a print controlling program according to this aspect, and FIG. 10-FIG. 14 are conceptual diagrams of contents for which control steps in FIG. 8 are executed. Now, there will be exemplified a case where a graphic (second print data) shown in FIG. 9A is scaled-up as shown in FIG. 9B and is then transparent-printed on the pattern (first print data) of a house shown in FIG. 9C.

When a transparent print process is selected, the transparent-printing program shown in FIG. 8 is started. Then, first of all, the number of divisions for dividing the second print data is determined (S1001 and S1002). Incidentally, various methods are considered for determining the number of divisions, and in this aspect, the number of divisions is determined on the basis of that storage capacity of the storage capacity of the RAM 15, which is utilizable at the start of the program (hereinbelow, the utilizable storage capacity shall be termed the "remaining memory").

More specifically, a storage capacity of 3 bytes is required for storing color image data of one pixel. Therefore, the storage capacity of a value with the width W of the second print data (refer to FIG. 10) as multiplied by 3 (=W×3) is required for storing data of one line in the case where the second print data is divided in single-pixel units in the vertical direction of FIG. 10.

When divided heights h (refer to FIG. 10), which can be stored in the remaining memory are calculated from the required storage capacity, each divided height h becomes (the size of the remaining memory)÷(the width×3). However, when a working storage area is reserved on the RAM 15 by using the divided height h, the remaining memory is entirely used up, and hence, it is highly possibly that other works will be influenced negatively.

In this aspect, therefore, the divided height h is set at a value obtained in such a way that the half of the remaining memory is divided by the value of the width W multiplied by 3 (=(the remaining memory÷2)÷(the width×3), as indicated at the step S1001, and the number of divisions is set at the quotient of a value obtained by dividing the height H of the second print data (refer to FIG. 10) by the divided height h (=H÷h) (S1002).

In this aspect, the second print data is scaled-up and is then transparent-printed on the first print data, so that the height H and width W of the second print data signify data in the scaled-up state of the original second print data. Accordingly, assuming a case where the second print data is transparent-printed without being scaled-up, the height H and width W of the second print data agree with the height H and width W of the original second print data, respectively.

Besides, when the number of divisions is determined at the step S1002, a divided area (refer to FIG. 11B) having the size of a value with the divided height h multiplied by the width w (=h×W), and a combining area (refer to FIG. 11C) having the size of a value obtained in such a way that a value with one line added to the divided height h is multiplied by the width W (=(h+1)×W), are reserved on the RAM 15 (S1003 and S1004). Incidentally, the reason why the value with one line added to the divided height h is set as the height of the combining area will be explained later.

Subsequently, the mask process is performed for the combining area by the same technique as in the first aspect, and the combining area is separated into partition areas to be rendered in a rendering area (areas indicated in white in FIG. 11C) and areas not to be rendered in the rendering area (areas indicated in black in FIG. 11C) (S1005).

Figure 11A:
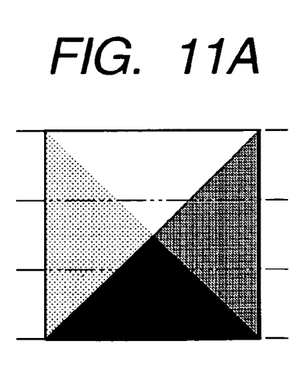
FIGS. 11A to 11C are conceptual diagrams of a content for which a control step in FIG. 8 is executed.
Figures 11B, 11C:
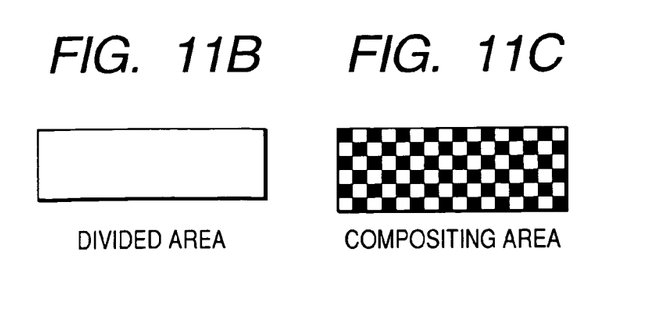
Figure 12:
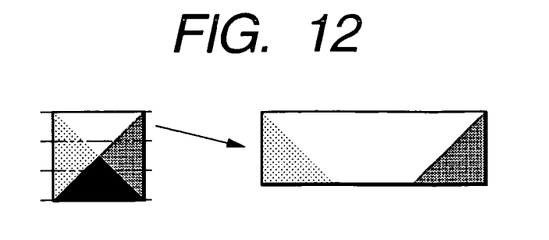
FIG. 12 is a conceptual diagram of a content for which a control step in FIG. 8 is executed.
Figure 13:
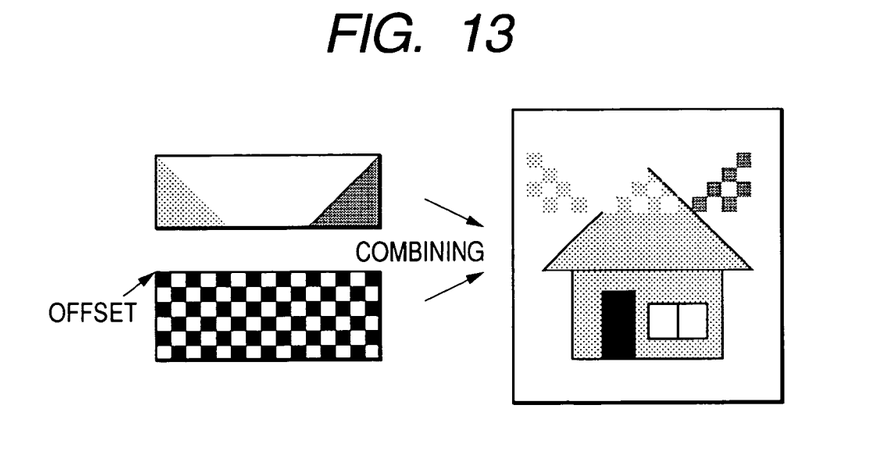
FIG. 13 is a conceptual diagram of a content for which a control step in FIG. 8 is executed.
Figure 14:
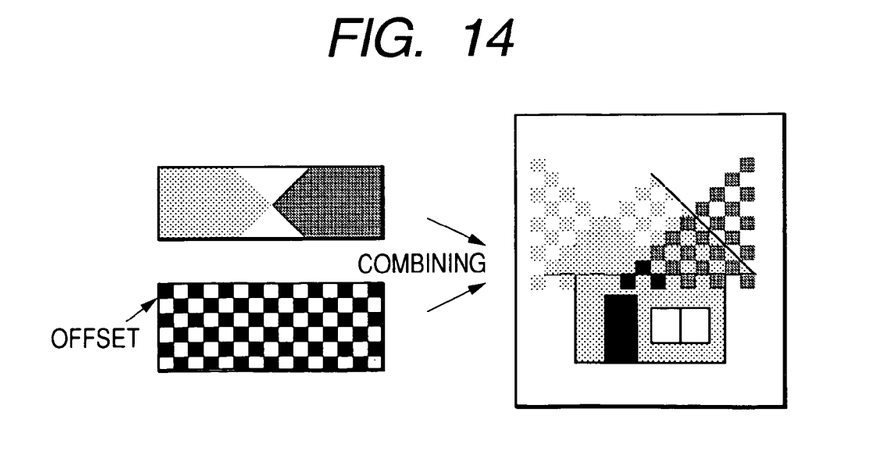
FIG. 14 is a conceptual diagram of a content for which a control step in FIG. 8 is executed.

More specifically, in the combining area shown in FIG. 11C, a large number of lines partitioning the combining area from the upper end to the lower end thereof in single-pixel units are supposed, and cells partitioning each of the large number of lines from the left end to the right end thereof in single-pixel units are supposed. Only the odd-numbered cells are rendered in black at the odd-numbered lines, whereas only the even-numbered cells are rendered in black at the even-numbered lines, whereby the mask process is performed for the areas partitioned in the checkered pattern.

Subsequently, "0" is substituted into a variable i indicating, which of the divided areas the data belongs to in the divided second print data (refer to FIG. 10) (S1006), and whether or not the variable i is smaller than the number of divisions determined at the step S1002 is thereafter decided (S1007).

Besides, in a case where the variable i has been decided as being smaller than the number of divisions (S1007: YES), the data of the ith divided area is rendered in the divided area in a scaled-up state (S1008), and an offset value, in the case of combining the divided area and the combining area and then rendering them in the rendering area, is thereafter determined (S1009).

The offset value is a value for changing-over a case (refer to FIG. 13) where the divided area and the combining area are combined in a state where the left upper end of the divided area and that of the combining area are held in agreement, and a case (refer to FIG. 14) where the divided area and the combining area are combined in a state where the left upper end of the divided area and a position being one line below the left upper end of the combining area are held in agreement. Concretely, the offset value is a remainder obtained when the y-coordinate of the rendering area (coordinate in the vertical direction of the rendering area) is divided by 2.

Accordingly, when the offset value is "0", the divided area and the combining area are combined in the state where the left upper end of the divided area and that of the combining area are held in agreement, and when the offset value is "1", the divided area and the combining area are combined in the state where the left upper end of the divided area and the position being one line below the left upper end of the combining area are held in agreement.

On this occasion, in the case of the offset value "0", one line on the lower end side of the combining area is not used in the combining with the divided area, whereas in the case of the offset value "1", one line on the upper end side of the combining area is not used in the combining with the divided area.

Therefore, assuming that the sizes of the divided area and the combining area are equal, a combining area, which corresponds to one line on the lower end side of the divided area, does not exist in the case of the offset value "1". In this aspect, accordingly, one line is added to the size of the divided area so as to compensate for the combining area.

Besides, when the offset value is determined, the divided area and the combining area are combined and are rendered in the rendering area in consideration of the offset value as stated above (S1010). That is, among the image data (pixels) of the divided area, the image data (pixels) lying at those positions of the combining area, which correspond to black, are not rendered in the rendering area, whereas among the image data (pixels) of the divided area, the image data (pixels) lying at those positions of the combining area, which correspond to white, are rendered in the rendering area.

Subsequently, "1" is added to the variable i (S1011) and the control program returns to the step S1007 again. Then, the steps S1008-S1011 are repeated until the variable i is decided as not being smaller than the number of divisions. In a case where the variable i has been decided as not being smaller than the number of divisions (S1007: NO), the control program ends.

Incidentally, the first print data and second print data, which have been combined in the rendering area, are subjected to a color conversion, a binarization process and a desired scale-down process, whereupon they are transmitted to and printed by the printer 20.

In the data, which have been separated by the mask process (S204) into the parts for use in the combining with the first print data and the parts not for use in the combining with the first print data, the data of the parts set for use in the combining with the first print data (parts in white in FIG. 6) are combined so as to be superposed on the first print data.

Accordingly, the second print data is combined on the first print data as in checkered rendering, so that the transparent print can be performed even in a printer such as GDI printer, which is not equipped with a device for interpreting the PDL.

Besides, the second print data is divided, and the divided data are combined on the first print data a plurality of separate times, so that the second print data can be transparent-printed even in a case where the storage capacity of the storage unit of the RAM 15 is small.

As described above, according to the aspect, the transparent print can be performed even in a case where the printer that is not furnished with the device for interpreting the PDL is connected to the PC 10 whose storage unit has a small storage capacity.

Besides, according to the aspect, in dividing the second print data, the number of divisions is determined in consideration of the remaining memory. It is therefore preventable that, during the execution of the transparent print, the storage capacity becomes insufficient to make the operation of the PC 10 unstable.

In the aspect, the steps S1001 and S1002 correspond to a print data division unit, the steps S1005 and 31010 correspond to a mask process unit, the step S1010 corresponds to a print data combining unit and the step S1007 corresponds to a repetition process unit.

Third Aspect

In each of the foregoing aspects, the second print data (watermark) is subjected to the mask process and is then combined with the first print data. In contrast, this aspect consists in that first print data subjected to a mask process is combined onto the first print data on which second print data is smeared.

Figure 3A:
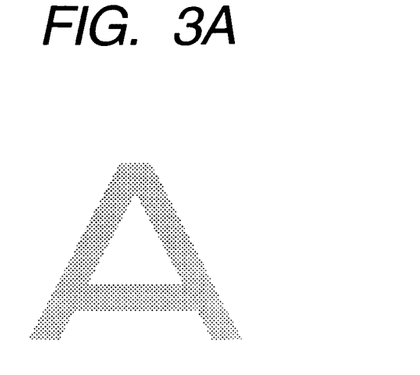
FIGS. 3A and 3B are diagrams showing data to-be-printed.
Figure 3B:
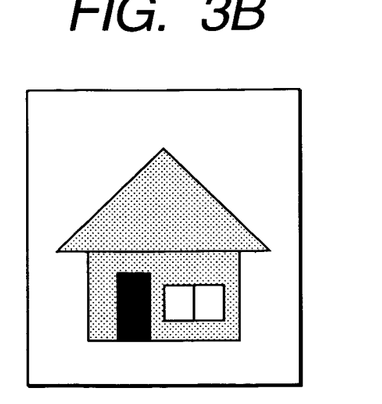
Figure 15:
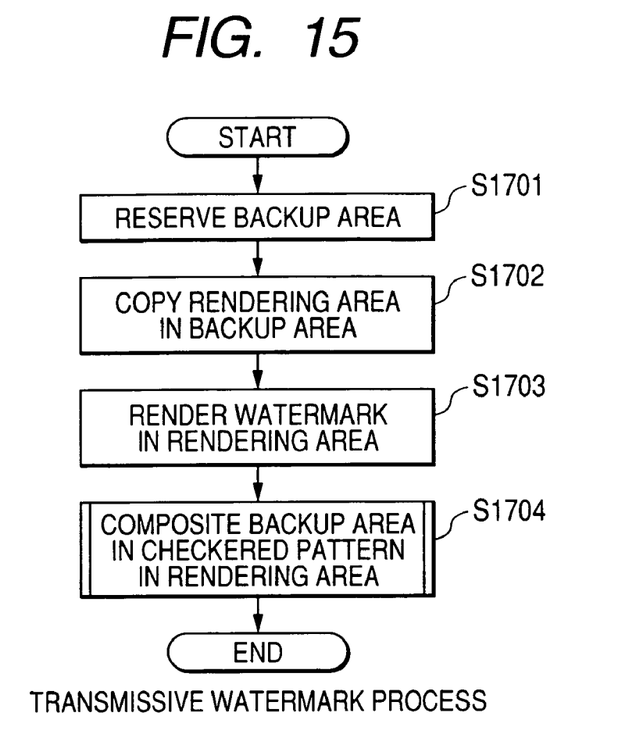
FIG. 15 is a flow chart showing the outline of a print controlling program according to the third aspect of the invention.
Figure 16A:
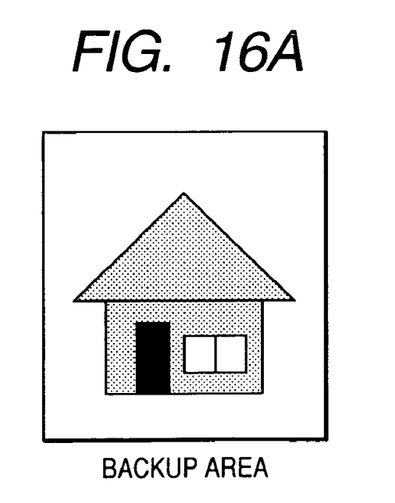
FIGS. 16A and 16B are conceptual diagrams of a content for which a control step in FIG. 15 is executed.
Figure 16B:
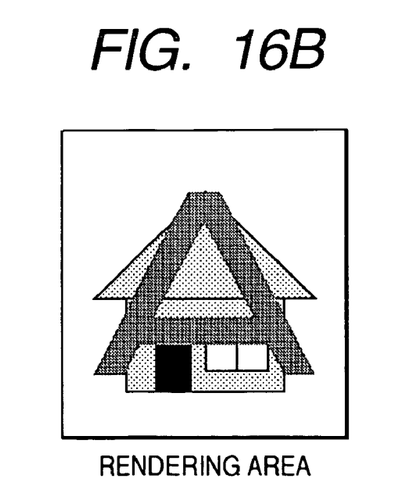
Figure 17:
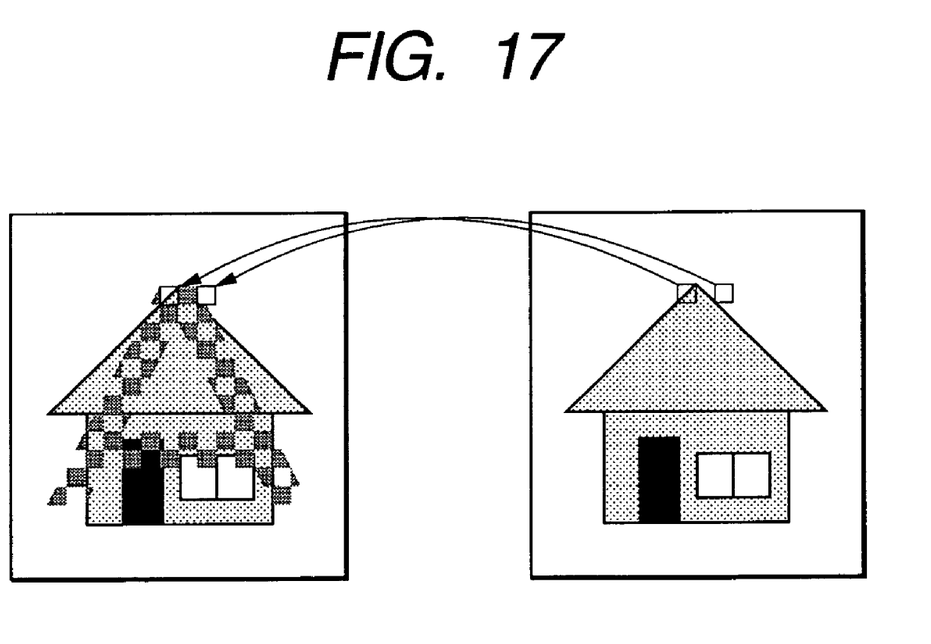
FIG. 17 is a conceptual diagram of a content for which a control step in FIG. 15 is executed.

FIG. 15 is a flow chart showing the control flow of a transparent-printing program according to this aspect, and FIGS. 16A, 16B and 17 are conceptual diagrams of contents for which control steps in FIG. 15 are executed. Now, the flow chart shown in FIG. 15 will be described assuming that, as in the first aspect, the pattern of the house shown in FIG. 3B is the first print data, while the letter "A" shown in FIG. 3A is the second print data (watermark).

When a transparent print process is selected, the transparent-printing program shown in FIG. 15 starts. Then, first of all, a backup area for storing a copy of the first print data is reserved on the RAM 15 (S1701). Incidentally, the backup area is a bitmap, which has about the same size as that of a rendering area and in which one pixel has 24 bits.

Subsequently, as shown in FIG. 16A, the first print data rendered in the rendering area is rendered in the backup area reserved at the step S1701 (S1702). Thereafter, as shown in FIG. 16B, the second print data is rendered in a manner to be superposed (smeared) on the first print data already rendered in the rendering area (S1703).

Thereafter, as shown in FIG. 17, the first print data rendered in the backup area is combined in the rendering area while being separated into parts to be combined in the rendering area and parts not to be combined in the rendering area, by the same technique as in the first aspect (S1704).

More specifically, in the backup area shown in FIG. 17, a large number of lines partitioning the backup area from the upper end to the lower end thereof in single-pixel units are supposed, and cells partitioning each of the large number of lines from the left end to the right end thereof in single-pixel units are supposed. Only the odd-numbered cells are rendered in the rendering area at the odd-numbered lines, whereas only the even-numbered cells are rendered in the rendering area at the even-numbered lines, whereby only the specified pixels (cells) are rendered in the rendering area while the mask process is being performed for the areas partitioned in the checkered pattern.

Incidentally, the first print data and second print data, which have been combined in the rendering area, are subjected to a color conversion, a binarization process and a desired scale-down process, whereupon they are transmitted to and printed by the printer 20.

In this aspect, in the data, which have been separated by the mask process unit into the parts for use in the combining with the first print data and the parts not for use in the combining with the first print data, the data of the parts set for use in the combining with the first print data are combined onto simple combining data in which the second print data is combined so as to be superposed on the first print data. Therefore, in the simple combining data, the first print data separated as the parts for use in the combining are combined so as to be superposed on parts corresponding to the second print data.

Accordingly, the situation becomes equivalent to a state where the second print data has been combined on the first print data as in checkered rendering, so that the transparent print can be performed even in a printer such as GDI printer, which is not equipped with a device for interpreting the PDL.

Besides, the first print data subjected to the mask process is combined onto the simple combining data, so that the second print data can be transparent-printed onto the first print data irrespective of whether or not the first print data (watermark) is character data or graphic data (bitmap).

In the aspect, the step S1701 corresponds to a print data backup unit, the step S1703 corresponds to an object data combining unit, and the step S1704 corresponds to a mask process unit and a print data combining unit.

Fourth Aspect

In this aspect, data to-be-combined is divided for the combining and the data to-be-combined is combined without being divided. The data to-be-combined are changed-over on the basis of the size of the data to-be-combined (on the basis of, for example, whether or not the data to-be-combined is composed of a plurality of colors), thereby efficiently performing transparent print.

Concretely, whether or not the second print data is composed of the plurality of colors is decided. When the second print data is composed of the plurality of colors, it is transparent-printed by the same technique as in the second aspect, whereas when the second print data is composed of a single color, such as black and white, it is transparent-printed by the same technique as in the first aspect.

Figure 18:
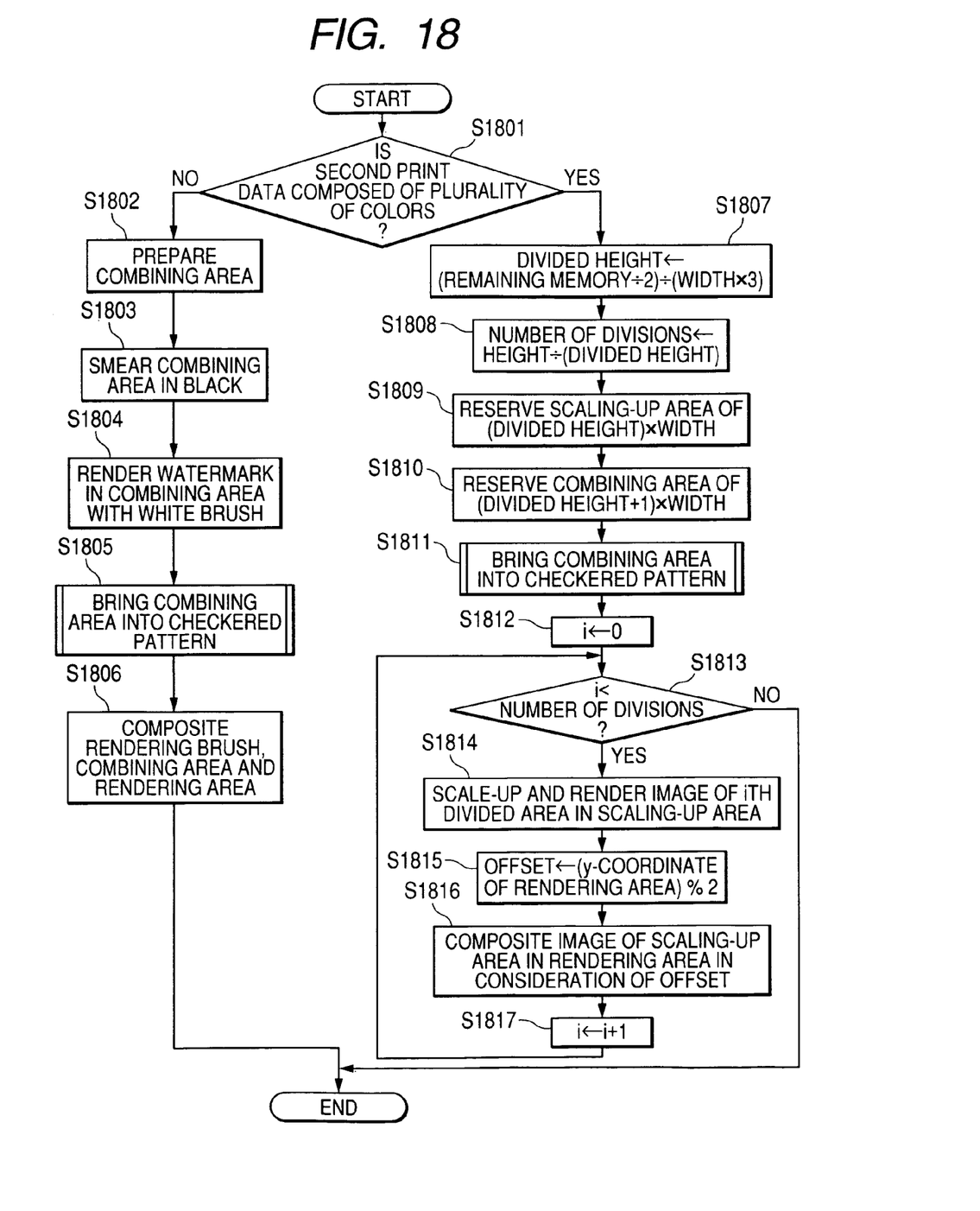
FIG. 18 is a flow chart showing the outline of a print controlling program according to the fourth aspect of the invention.

FIG. 18 is a flow chart showing the control flow of a transparent-printing program according to this aspect. When a transparent print process is selected, the transparent-printing program shown in FIG. 18 is started.

Then, first of all, whether or not the second print data is composed of a plurality of colors is decided (S1801). In a case where the second print data has been decided as being composed of a single color, such as black and white (S1801: NO), it is transparent-printed onto the first print data by the same technique as in the first aspect (S1802-S1806).

More specifically, a combining storage area of the same size as a storage capacity necessary for rendering a final rendered result on the RAM 15 is reserved in the RAM 15 (S1802). Thereafter, the whole combining area is smeared in black (S1803), and the second print data is rendered in white in the combining area smeared in black (S1804).

Besides, when the processing of the step S1804 is ended, the combining area is separated into partition areas to be rendered in a rendering area and areas not to be rendered in the rendering area. That is, the combining area is partitioned in a checkered pattern (S1805). Thereafter, image data rendered in the combining area subjected to a mask process at the step S1805 are combined so as to be superposed on the first print data rendered in the rendering area (S1806).

On this occasion, among the image data rendered in the combining area, the partition areas indicated in black are not rendered in the rendering area, whereas the partition areas indicated in white are rendered in the original color of the second print data (in this aspect, red) so as to be superposed on the first print data.

Besides, in a case where the second print data has been decided at the step S1801 as being composed of the plurality of colors (S1801: YES), it is transparent-printed onto the first print data by the same technique as in the second aspect (S1807-S1817).

More specifically, first of all, the number of divisions for dividing the second print data is determined (S1807 and S1808). Besides, when the number of divisions is determined, a divided area, having the size of a value with the divided height h multiplied by the width W (=h×W), and a combining area, having the size of a value obtained in such a way that a value with one line added to the divided height h is multiplied by the width W (=(h+1)×W), are reserved on the RAM 15 (S1809 and S1810).

Subsequently, the combining area is subjected to a mask process so as to be separated into partition areas, which are to be rendered in a rendering area, and areas, which are not to be rendered in the rendering area (S1811). Thereafter, "0" is substituted into a variable i indicating which of the divided areas the data belongs to in the divided second print data (S1182).

Besides, whether or not the variable i is smaller than the number of divisions determined at the step S1808 is decided (S1813). In a case where the variable i has been decided as being smaller than the number of divisions (S1813: YES), the data of the ith divided area is rendered in the divided area in a scaled-up state (S1814), and an offset value in the case of combining the divided area and the combining area and then rendering them in the rendering area is thereafter determined (S1815).

Besides, when the offset value is determined, the divided area and the combining area are combined and are rendered in the rendering area in consideration of the offset value (S1816). That is, among the image data (pixels) of the divided area, the image data (pixels) lying at those positions of the combining area, which correspond to black, are not rendered in the rendering area, whereas among the image data (pixels) of the divided area, the image data (pixels) lying at those positions of the combining area, which correspond to white, are rendered in the rendering area.

Subsequently, "1" is added to the variable i (S1817), and the control program returns to the step S1813 again. Then, the steps S1814-S1817 are repeated until the variable i is determined not to be smaller than the number of divisions. In a case where the variable i has been decided as not being smaller than the number of divisions (S1813: No), the control program is ended.

Incidentally, the first print data and second print data, which have been combined in the rendering area, are subjected to a color conversion, a binarization process and a desired scale-down process, whereupon they are transmitted to and printed by the printer 20.

In the aspect, when the second print data is composed of the plurality of colors, the transparent print is performed by the same technique as in the second aspect, whereas when the second print data is not composed of the plurality of colors. That is, when the second print data is composed of the single color such as black and white, the transparent print is performed by the same technique as in the first aspect. Accordingly, the transparent print can be performed by the optimal technique corresponding to the storage capacity of the RAM 15, so that the transparent print can be efficiently performed.

In the aspect, the step S1801 corresponds to a composing color detection unit, the steps S1807 and S1808 correspond to a print data division unit, the step S1805 corresponds to a first mask unit, the step S1816 corresponds to a second mask unit, the step S1806 corresponds to a first print data combining unit, the step S1816 corresponds to a second print data combining unit, the step S1813 corresponds to a repetition process unit and the steps S1802 to S1806 correspond to a process unit.

Incidentally, the aspect is characterized in that the case of dividing and then combining the data to-be-combined and the case of combining the data to-be-combined without dividing this data are changed-over on the basis of the size of the data to-be-combined. Therefore, this aspect may well be such that, for example, a case where transparent print is performed by combining the technique indicated in the third aspect and the technique indicated in the second aspect, or by repeatedly executing the technique indicated in the third aspect, and a case where transparent print is performed by executing the technique indicated in the third aspect, one time, are changed-over on the basis of the size of the data to-be-combined.

Other Aspects

In each of the foregoing aspects, the mask process has been executed while the data to-be-combined is being partitioned in the checkered pattern. However, the invention is not restricted to such an aspect, but it may well make each partitioned area oblong by way of example.

Besides, the first and third aspects have exemplified the character data. However, the invention is not restricted to the character data, but it is also applicable to the image data of, for example, a bitmap.

Besides, the second aspect has exemplified the bitmap data. However, the invention is not restricted to the bitmap data, but it is also applicable to, for example, character data.

Besides, in each of the foregoing aspects, the data to-be-combined has been separated into the areas for use in the combining and the areas not for use in the combining, separating every other pixel in the mask process. However, the invention is not restricted to such an aspect, but it may well separate the data to-be-combined in different ways. For example, this data may be separated into the areas for use in the combining and the areas not for use in the combining at a part where the data changes greatly and a part where the data changes little.

Besides, in each of the foregoing aspects, the invention has been described by exemplifying the simple printer 20 as an electronic equipment, which is connected to the computer. However, the invention is not restricted to the simple printer, but it may well employed as the electronic equipment, a multipurpose printer that has, in addition to a printer function (print function), a so-called "facsimile function" and the scanner function of loading characters or an image recorded on paper or the like and then electronicizing the loaded information.

Besides, in each of the foregoing aspects, the print system according to the invention has been configured by installing the print controlling program according to the invention, in the general-purpose computer. However, the invention is not restricted to such an aspect, but a print system according to the intention may well be configured by, for example, a dedicated computer, which is constructed of dedicated hardware that operates similarly to the print controlling program.

Besides, in each of the foregoing aspects, the first and second print data have had the rectangular data areas, but the invention is not restricted to such an aspect.

Moreover, the invention may correspond to its purport defined in the appended claims, and it shall not be restricted to the foregoing aspects.

What is claimed is:

1. A computer storage medium readable by a computer having a storage unit, the storage medium storing a computer program for transparent-printing second print data in superposition on first print data, the computer program, when executed by the computer, causing the computer to perform operations comprising:
   detecting whether or not the second print data is composed of a plurality of colors;
   when the second print data has been decided as being composed of the plurality of colors:
      dividing the second print data at a predetermined number of divisions;
      separating the divided data into a part for combining with the first print data and a part not for combining with the first print data;
      combining the part of the divided data set for combining with the first print data so as to be superposed on the first print data; and
      repeating the separating of the divided data and the combining of the part of the divided data by the same number of times as the number of divisions, and
   when the second print data has been decided as not being composed of the plurality of colors:
      separating the second print data into a part for combining with the first print data and a part not for combining with the first print data without dividing the second print data; and
      combining the part of the second data set for combining with the first print data so as to be superposed on the first print data.

2. The computer storage medium according to claim 1, wherein the number of divisions is determined based on storage capacity of the storage unit, which is utilizable at the operation of the dividing.

3. The computer program medium according to claim 1, wherein the separating is executed in a checkered pattern.

4. The computer storage medium according to claim 1, wherein the number of divisions is determined based on storage capacity of the storage unit, which is utilizable at the operation of the dividing, and a value, which is obtained in such a way that a size of one side of an area necessary for rendering the print data to be divided is multiplied by 3.

5. A computer storage medium readable by a computer having a storage unit, the storage medium storing a computer program for transparent-printing second print data in superposition on first print data, the computer program, computer, causing the computer to perform operations comprising:
   detecting whether or not the second print data is composed of a plurality of colors;
   when the second print data has been decided as being composed of the plurality of colors:
      dividing the second print data at a predetermined number of divisions;
      separating the divided data into parts for combining with the first print data; and parts not for the combining with the first print data;
      combining the parts of the divided data set for the combining with the first print data so as to be superposed on the first print data; and
      repeating the separating of the divided data and the combining of the parts of the divided data repeatedly the same number of times as the number of divisions; and
   when the second print data has been decided as not being composed of the plurality of colors:
      separating the second print data into parts for combining with the first print data and parts not for the combining with the first print data; and
      combining the data of the parts set for the combining with the first print data so as to be superposed on the first print data,
   wherein the number of divisions is determined based on storage capacity, which is utilizable at the operation of the dividing, and a value, which is obtained in such a way that a size of one side of an area necessary for rendering the print data to be divided is multiplied by 3.

6. A printer system for transparent-printing second print data in superposition on first print data, comprising:
   a printer that prints print data;
   a storage unit that is controlled by an arithmetic circuit;
   a composing color detection unit that detects whether or not the second print data is composed of a plurality of colors;
   a print data division unit that divides the second print data at a predetermined number of divisions, when the second print data has been decided as being composed of the plurality of colors;
   a first mask process unit that separates the second print data into a part for combining with the first print data and a part not for combining with the first print data;
   a second mask process unit that separates the data divided by the print data division unit into a part for combining with the first print data and a part not for combining with the first print data;
   a first print data combining unit that composites the part of the second data set for combining with the first print data by the first mask process unit so as to be superposed on the first print data;
   a second print data combining unit that composites the part of the divided data set for combining with the first print data by the second mask process unit so as to be superposed on the first print data;
   a repetition process unit that operates the second mask process unit and the second print data combining unit repeatedly by the same number of times as the number of divisions, when the second print data has been decided as being composed of the plurality of colors; and
   a process unit that operates the first mask process unit and the first print data combining unit without operating the print data division unit, when the second print data has been decided as not being composed of the plurality of colors.

7. The printer system according to claim 6, wherein the print data division unit determines the number of divisions based on storage capacity of the storage unit, which is utilizable at the operation of the print data division unit.

8. The print system according to claim 6, wherein the first mask process unit executes the separating in a checkered pattern.

9. The print system according to claim 6, wherein the print data division unit determines the number of divisions based on storage capacity of the storage unit, which is utilizable at the operation of the print data division unit, and a value, which is obtained in such a way that a size of one side of an area necessary for rendering the print data to be divided by the print data division unit is multiplied by 3.

10. A printer system for transparent-printing second print data in superposition on first print data, comprising:

a printer that prints the print data;

a storage unit that is controlled by an arithmetic unit;

a first mask process unit that separates the second print data into parts for combining with the first print data and parts not for the combining with the first print data; and a first print data combining unit that composites the data of the parts set for the combining with the first print data so as to be superposed on the first print data;

a composing color detection unit that detects whether or not the second print data is composed of a plurality of colors;

a print data division unit that divides the second print data at a predetermined number of divisions, when the second print data has been decided as being composed of the plurality of colors;

a second mask process unit that separates the data divided by the print data division unit into parts for the combining with the first print data and parts not for the combining with the first print data;

a second print data combining unit that composites the data of the parts set for the combining with the first print data so as to be superposed on the first print data;

a repetition process unit that operates the second mask process unit and the second print data combining unit repeatedly the same number of times as the number of divisions, when the second print data has been decided as being composed of the plurality of colors; and a process unit that operates the first mask process unit and the first print data combining unit when the second print data has been decided as riot being composed of the plurality of colors wherein the print data division unit determines the number of divisions based on storage capacity the storage unit, which is utilizable at the operation of the print data division unit, and a value, which is obtained in such a way that a size of one side of an area necessary for rendering the print data to be divided by the print data division unit is multiplied by 3.

* * * * *